US005584438A

United States Patent [19]
Jagersberger

[11] Patent Number: 5,584,438
[45] Date of Patent: Dec. 17, 1996

[54] PROCESS AND DEVICE FOR PRODUCING A TRANSFORMER WINDING

[75] Inventor: Kurt Jagersberger, Pernitz, Austria

[73] Assignee: Firma Asta Elektrodraht GmbH, Neustadt, Austria

[21] Appl. No.: 232,085

[22] PCT Filed: Nov. 9, 1992

[86] PCT No.: PCT/AT92/00143

§ 371 Date: May 11, 1994

§ 102(e) Date: May 11, 1994

[87] PCT Pub. No.: WO93/10543

PCT Pub. Date: May 27, 1993

[30] Foreign Application Priority Data

Nov. 15, 1991 [AT] Austria .................................. 2275/91

[51] Int. Cl.$^{6}$ .................................................. H02K 15/04
[52] U.S. Cl. ......................... 242/444; 29/605; 140/92.1
[58] Field of Search ............................ 29/605; 140/92.1; 242/7.11, 7.03

[56] References Cited

U.S. PATENT DOCUMENTS

| | | | |
|---|---|---|---|
| 2,249,509 | 7/1941 | Welch, Jr. et al. | 140/71 R |
| 3,518,755 | 7/1970 | Olson | 29/605 |
| 3,747,205 | 7/1973 | Moore | 29/605 |
| 4,337,567 | 7/1982 | Lugosi et al. | 29/605 |
| 4,523,447 | 6/1985 | Sticht et al. | 72/144 |
| 5,114,517 | 5/1992 | Riggingale et al. | 29/605 |
| 5,187,859 | 2/1993 | Heim | 29/605 |
| 5,331,800 | 7/1994 | Schaumburg et al. | 29/605 |

FOREIGN PATENT DOCUMENTS

| | | | |
|---|---|---|---|
| 2017894 | 1/1991 | Canada | H01B 12/00 |
| 0105426 | 4/1984 | European Pat. Off. | H01F 41/06 |
| 0408832 | 1/1991 | European Pat. Off. | H01B 13/02 |
| 2013949 | 4/1970 | France | H01F 41/00 |

*Primary Examiner*—Katherine Matecki
*Attorney, Agent, or Firm*—Greenblum & Bernstein P.L.C.

[57] ABSTRACT

A process and a device for performing the process are each provided, where the process produces a transformer winding from angularly profiled wires, where the angularly profiled wires are wound by guiding the same into a twist head and arranging such unwound profiled wires into two adjacently located conductor stacks, upper and lower conductors from the respective stacks being interchanged to the other stack through an offset. A twisted conductor is formed and is wound on a support cylinder in order to conform the twisted conductor to a transformer winding which is to be placed on the core of the transformer. While winding the twisted conductor onto the support cylinder, the position of the same is continuously detected, and an output signal indicating the position is outputted to a comparing mechanism for comparing the actual detected position to a preset value. In addition, the diameter of the resulting winding is scanned, and based upon the winding diameter, the twist head is controlled accordingly.

16 Claims, 1 Drawing Sheet

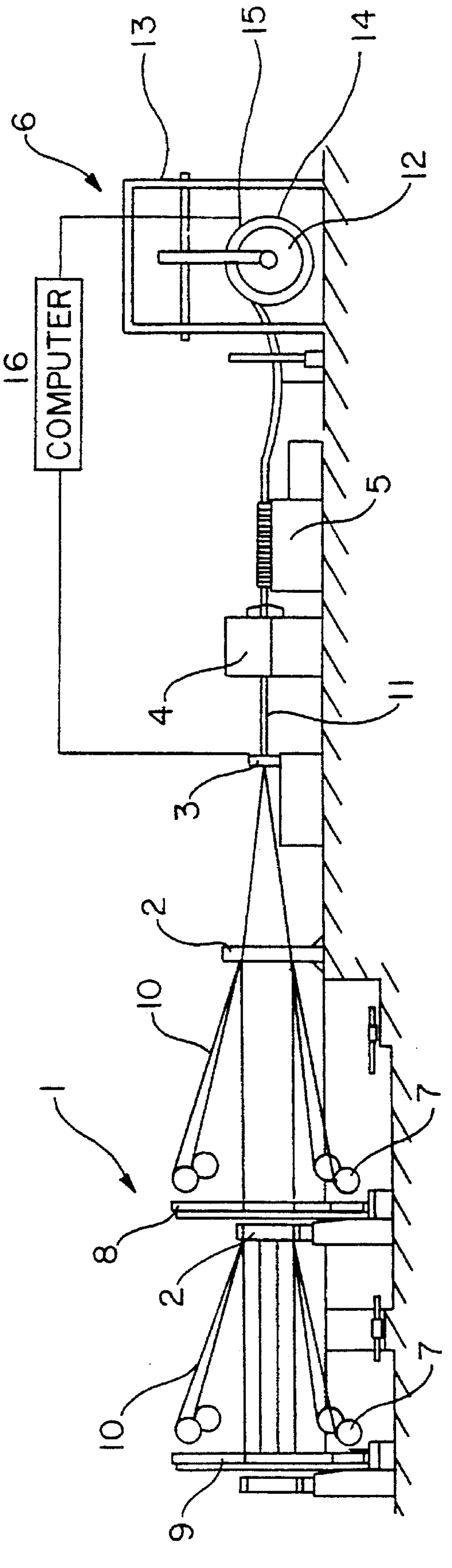
FIG.

PROCESS AND DEVICE FOR PRODUCING A TRANSFORMER WINDING

BACKGROUND OF THE INVENTION

1. Field of the Invention

The present invention relates to a process and apparatus for producing a winding for transformers. More particularly, the present invention relates to a process for producing a transformer winding from angularly profiled (rectangularly cross-sectioned) wires, wherein the profiled wires are brought together in a twist head and twisted to form a twisted conductor. The individual wires are brought together to form two adjacent groups of wires, each group including two flat sides. The individual wires positioned at the flat sides, i.e., the respective top and bottom conductors, of each of the adjacent groups extend obliquely in opposite directions so as to switch sides through an offset on the narrow sides of the cross section. Concurrently, the top conductor of group 1 extends over to group 2 to become the top conductor of group 2 (the previous top conductor of group 2 is now second from the top), and the bottom conductor of group 2 extends over to group 1 to become the bottom conductor of group 1 (the previous bottom conductor of group 1 is now second from the bottom). Thus, the top two (or bottom two) individual wires, which are disposed on top of each other (before twisting) in their cross section are disposed next to each other (after twisting), and are spaced from each other if necessary. The resulting twisted conductor is enclosed in insulation in at least sectionally.

2. Description of Background and Relevant Information

A device for producing twisted conductors is disclosed in EP-A 408,832. The production of a twisted conductor is also disclosed in principle.

In producing a winding for a transformer, conventionally, the twisted conductor has been produced at a first station and the winding for the transformer has been produced at another station. In performing such an operation, the twisted conductor is therefore wound on a transport drum while at the first station. In most cases, the transport drum has a considerably smaller diameter than the core diameter of the transformer winding. Accordingly, in taking the twisted wire from the transport drum and then producing the winding at another station, deformation of the twisted conductor is unnecessarily done twice.

A method for rolling a conductor is disclosed in U.S. Pat. No. 3,747,205. Such method of rolling up conductors is performed in connection with pancake coils which are wound on a core with a rectangular cross section. This structure is intended to prevent displacement or slipping of the insulation which occurs with rectangular cores.

SUMMARY OF THE INVENTION

It is an object of the present invention to provide a process for producing a transformer winding using angularly profiled wires such as those described above. It is an object of the invention to provide such a process which further improves the quality of the resulting winding but allows such a winding to be produced in an economical fashion. The process of the present invention is distinguished in that a twisted conductor is wound on a support cylinder to form to the transformer winding and the transformer winding is placed on the core of the transformer. In addition, the step of twisting the conductor is controlled by controlling the twist head in accordance with its actual winding diameter.

By utilizing the process of the present invention, it is possible to produce a transformer winding without performing the intermediate step of rolling up the twisted conductor, before again winding the twisted conductor in the form of a transformer winding. Thus, two deformations of the finished twisted conductor are no longer performed. In previous and conventional systems, where the twisted conductor is rolled twice resulting in unnecessary deformations, the paper insulation becomes bunched up, leading to a constriction of the cooling conduits in the finished transformer. This causes a diminished circulation of the coolant in the transformer.

In order to produce a transformer winding to exact measurements, the position of a twisted conductor is monitored. For example, by varying the insulating paper layers as well as the selection of the insulation paper thickness, differences in the dimensions can be easily corrected.

Another requirement in calculating the winding can be satisfied by the present invention. In this regard, each individual profiled wire of the twisted conductor was supposed to pass through exactly one cycle per winding. That is, each individual conductor of the twisted conductor rotates, or returns to its original position, e.g., top conductor of group 1, for each complete twist of the twisted conductor. Thus, for the example above, an individual conductor changes its position from top conductor of group 1 to top conductor of group 2; from top conductor of group 2 to second (from top) conductor of group 2; . . . ; from bottom conductor of group 2 to bottom conductor of group 1; from bottom conductor of group 1 to second (from bottom) conductor of group 1; . . . ; from second (from top) conductor of group 1 to top conductor of group 1. This completes cycle of rotation for the individual wire and one twist of the twisted conductor. By utilizing the process of the invention, it is now possible to control the twisting step via the twist head in such a way that this requirement can be met. This is of particular importance in view of the so-called cooling conduit twisted conductor. With this type of twisted conductor, the partial conductors (individual wires) have considerably stronger offsets. Thus, the two partial conductor stacks extend parallel with each other and are spaced from each other. An intermediate piece, i.e. spacer, is disposed in this space in the area of the offset. For the twisted conductor, this results in a cooling conduit for the passage of coolant in the radial direction. If the twisting step is now selected in accordance with the present invention as a function of the winding diameter, radially free cooling conduits are formed and the areas of the offsets are located on a radius. This results in swirl-free coolant flows.

In accordance with a further aspect of the present invention, the twisted conductor is subjected, while being wound onto the support cylinder, to a steady continuous pressure force, preferably 100 to 300 $N/cm^2$. This allows the insulating paper to be appropriately smoothed. In addition, a virtual ironing-out of the folds in the paper is performed. These paper folds can be caused by pushing on the side support cylinder of the paper insulation. By preventing these folds, the coolant is allowed to freely flow through the cooling conduit.

In accordance with a further aspect of the present invention, the twisting conductor may have an exterior insulation with spot-like epoxy layers wound on the support cylinder under the action of heat. Because the paper which forms the outermost insulating layer is coated with epoxy resin, which can be polymerized by, e.g., the effect of heat, the addition of spacing washers (which are removed prior to installation of the winding, and which prevent the paper from bunching up during pressing) is not necessary.

An essential feature of the invention is a device for executing the process of the present invention. Such a device comprises a twist basket installation on which the individual spools with the profiled wires are disposed. The device further comprises a planetary head for guiding in a twist-free fashion the profiled wires which are downstream from the planetary head, and a twist head in which the respective upper and lower conductors from the two adjacent profiled conductor stacks change over through an offset into the other stack. The device of the present invention is distinguished in that the twisted conductor produced in the twist head runs through an insulation-applying machine, and is brought by a caterpillar pull-off to a transversing winding device containing the support cylinder for the transformer winding. An electronic linear measuring device is provided for continuously monitoring the position of the twisted conductor on the support cylinder. The output signals of the electronic linear measuring device can be input to a comparing mechanism which compares the actual/measured value to a preset value, where the comparing mechanism preferably comprises a computer. In addition, a pick-up mechanism may be provided in the winding device for monitoring/scanning the diameter of the winding and for controlling the twist head.

The device of the present invention makes it possible for the first time to produce a complete transformer winding at the same place where the winding material itself is produced. The support cylinder for the transformer winding, which can be placed on the transformer core, is clamped into the winding device. It is thus possible to produce the winding, conforming to calculations and structural requirements, immediately after it has been manufactured. In order to avoid unnecessary deformations of the twisted conductor, this winding device is configured/embodied so that the twisted conductor is fed in a constant manner and so that the support cylinder is moved accordingly. It makes no difference whether the support cylinder is clamped vertically or horizontally.

By monitoring the position, it is possible to perform a constant extrapolation of the actual total structural height. As is generally known, the height of the winding must correspond to the height of the iron yoke. Accurate production is thus assured by this correspondence in height. The winding head can be controlled by means of the electrical signals emitted by the pick-up mechanism, which detects the winding data, such data including, e.g., the winding diameter. Utilizing such winding data, e.g., a computer may set the optimal twisting step in an automated manner.

In accordance with a further feature of the present invention, the transversing winding device may further consist of an expanding arbor seated in a frame, which can be moved horizontally and vertically. The selection of an expanding arbor provides the advantage of universal applicability to windings or support cylinders having widely varying diameters.

In accordance with a further embodiment of the present invention, the expanding arbor is pivotable in the horizontal plane. During the production of a winding, it has been shown that an oblique position of the support cylinders in the horizontal plane assures an optimum winding process.

In accordance with a further embodiment/aspect of the invention, cylinders may be provided upon which a load can be placed pneumatically or hydraulically for generating pressure forces on the twisted conductor during the winding process. As previously mentioned, such cylinders are used in order to smooth the paper insulation.

In accordance with a further feature of the present invention, the cylinders can be heated, or heatable plates may be provided to generate heat effects on the twisting conductor. By utilizing such heating, paper which is coated with cast resin in spots may be polymerized. In this way, the bunching of the paper and the resulting reduction in the cooling conduit cross section may be prevented.

BRIEF DESCRIPTION OF THE DRAWINGS

Other characteristics and advantages of the invention will become apparent from the following description with reference to the non-limiting, annexed drawing, wherein:

a FIGURE is provided which illustrates a twisting conductor machine for producing twisted conductors.

DETAILED DESCRIPTION OF THE EXEMPLARY EMBODIMENTS

The illustrated twisting conductor machine consists of a twist basket installation 1, a planetary head 2, a twist head 3, an insulation-applying machine 4, a caterpillar pull-off mechanism 5, and a transformer winding device 6.

The individual spools 7 have angularly profiled wires 10 wound thereon, and are disposed on the twist basket installation 1. In the event that the twisted conductor machine is a machine for producing large twisted conductors, it is possible to arrange a plurality of yoke rings 8, 9 behind each other. Each one of the yoke rings can be individually rotated and/or may be connected to each other so that all of the yoke rings 8, 9 can be rotated together. Each spool 7 has a brake. When the yoke rings 8, 9 are disposed behind each other, the profiled wires 10 must be guided precisely between the yoke rings and protected against bends and contortions. In addition, each profiled wire 10 is monitored as it is being unwound from the spool 7 by means of a monitoring device, such monitoring device comprising, e.g., a chopper bar which drops when the wire breaks or ends. Such a chopper bar may drop because of gravity and thereby stop the twisted conductor machine.

In addition, each of the yoke rings 8, 9 may be equipped with a brake for braking the yoke rings 8, 9 within a suitable period of time. In order to guide the profiled wires 10 in a twist-free fashion, it is necessary to provide a planetary head 2 and backtwists between the yoke rings 8, 9 and between the yoke ring 8 and the twist head 3.

The individual profiled wires 10 are twisted or turned together in the twist head 3. During twisting or turning together of the individual profiled wires 10, the respective uppermost and lowermost conductor from two adjacent stacks of profiled wires 10 are transferred to the other stack with the aid of complicated mechanical displacement mechanisms, and such a transfer is performed without damage to the already applied enamel or other insulation.

The twisted conductor 11 which is produced in the twist head is wound with the most varied layers of insulating paper, fiberglass ribbons, or foils in the subsequent insulation-applying machine 4, which can consist of a plurality of applicators disposed behind each other. The insulation can be applied only to certain sections, such as only in the offset places, or it may be applied continuously over the entire twisted conductor.

A caterpillar pull-off mechanism 5 may be provided which is pivotable in order to adapt itself to the bundle size of the twisted conductor. The caterpillar pull-off mechanism 5 is provided for pulling off the twisted conductor 11 from the twisted conductor machine.

A winding device 6 is provided downstream of the caterpillar pull-off mechanism 5. The illustrated winding device 6 consists of a transversing expanded arbor 12 which can be moved vertically as well as horizontally in a frame 13. The expanding arbor 12 can also be pivoted in the horizontal plane. A support cylinder 14 is disposed on the expanding arbor 12, and may later be placed directly on the transformer core.

By utilizing the machine illustrated in the FIGURE, the winding may be produced in accordance with the desired calculations and structural requirements immediately after the twisted conductor has been produced. In performing the winding process, the finishing of the transformer winding on the support cylinder 14 may be accomplished by insertion of bars or spacing washers between each winding. However, according to the present invention, spacing inserts are not required.

A pick-up mechanism 15, which scans the winding diameter, may be provided for controlling the twist head 3. The winding data of the transformer winding, such data including information such as the winding diameter, is detected by means of this pick-up mechanism, and corresponding signals produced by that mechanism are used by, for example, a computer 16 to control the twist head 3 in order to be able to always select the optimal twisting step.

Of course, the invention as described herein is not limited to the embodiments described and represented as examples above, but also includes all technical equivalents as well as combinations thereof.

I claim:

1. A process for producing a transformer winding from angularly profiled wires, said process comprising:

bringing together the profiled wires in a twist head and twisting the profiled wires into a twisted conductor wherein the individual profiled wires are gathered in two groups that collectively form two sides of a cross section of the resulting twisted conductor, the individual profiled wires from each side of the cross section extending obliquely in opposite directions from one of the sides to another through an offset on the narrow sides of the cross section, and further wherein the individual profiled wires which are disposed on top of each other in one side of the cross section are disposed next to each other when viewing the cross section of the twisted conductor;

winding the resulting twisted conductor on a support cylinder to form to a transformer winding for placement on a core of a transformer;

continuously detecting the position of the twisted conductor on the support cylinder and providing detected position data to a computer; and controlling the twisting of the twisted conductor by controlling the twist head in accordance with a winding diameter of the twisted conductor as it is being wound on the support cylinder.

2. The process according to claim 1, wherein in twisting the profiled wires into a twisted conductor, the profiled wires are at least partially enclosed in insulation.

3. The process according to claim 1, further comprising subjecting the twisted conductor to a steady continuous pressing force during winding of the twisted conductor on the support cylinder.

4. The process according to claim 3, wherein the steady continuous pressing force is substantially within the range from 100 to 300 $N/cm^2$.

5. The process according to claim 1, wherein the twisted conductor comprises an exterior insulation coated with epoxy at certain portions along the extent of the conductor, and wherein said step of winding said twisted conductor comprises winding of the twisted conductor while applying heat to the support cylinder.

6. A device for producing a transformer winding from angularly profiled wires, said device comprising:

a twist basket installation having individual spools carrying profiled wires;

a planetary head provided downstream of said twist basket installation;

a twist head provided downstream from said planetary head, said planetary head guiding the profiled wires in a twist-free fashion into said twist head, said twist head comprising means for changing over upper and lower conductors from two adjacently located profiled conductor stacks and exchanging those conductors through an offset into the other stack;

an insulation-applying machine for receiving the twisted conductor produced in said twist head;

a caterpillar pull-off mechanism;

a transversing winding device having a support cylinder, said transversing winding device receiving the twisted conductor via said caterpillar pull-off mechanism and said support cylinder supporting a transformer winding;

an electronic linear measuring device for continuously monitoring the position of the twisted conductor on the support cylinder and for outputting signals indicative of the monitored position;

a comparing mechanism receiving the output signals from said electronic linear measuring device and comparing said output signals to a set value; and a pick-up device provided on the winding device for scanning the winding diameter of the twisted conductor as it is wound onto said support cylinder, and for controlling said twist head in accordance with the scanned winding diameter.

7. The device according to claim 6, wherein said comparing mechanism comprises a computer.

8. The device according to claim 6, wherein said transversing winding device comprises an expanding arbor seated on a frame, and means for supporting said expanding arbor so that said expanding arbor is movable in horizontal and vertical directions.

9. The device according to claim 8, wherein said expanding arbor comprises means for pivoting said expanding arbor in the horizontal plane.

10. The device according to claim 8, further comprising means for heating said cylinders.

11. The device according to claim 6, further comprising cylinders for generating a pressure force on the twisted conductor during winding by said winding device.

12. The device according to claim 11, wherein said cylinders comprise means for applying a pressure force pneumatically.

13. The device according to claim 11, wherein said cylinders comprise means for applying a pressure force hydraulically.

14. The device according to claim 6, further comprising heatable metal plates for generating heat to be applied to the twisted conductor.

15. A process for producing a transformer winding from angularly profiled wires, said process comprising:

bringing together the profiled wires in a twist head and twisting the profiled wires into a twisted conductor so that the individual profiled wires are gathered in two groups disposed next to each other when viewing the cross section of the twisted conductor;

winding the twisted conductor on a support cylinder to conform to a transformer winding;

continuously detecting the position of the twisted conductor on the support cylinder; and controlling the twisting of the twisted conductor by controlling the twist head in accordance with a detected winding diameter of the twisted conductor as it is being wound on the support cylinder.

16. A device for producing a transformer winding from angularly profiled wires, said device comprising:

a twist basket installation having individual spools carrying profiled wires;

a twist head provided downstream from said twist basket installation, said twist heading comprising means for changing over upper and lower conductors from two adjacently located profiled conductor stacks and exchanging those conductors through an offset into the other stack;

an insulation-applying machine for receiving the twisted conductor produced in said twist head and applying insulation to at least certain sections of said twisted conductor;

a transversing winding device receiving the twisted conductor and winding said twisted conductor onto a support cylinder;

means for monitoring the position of the twisted conductor on the support cylinder;

means for comparing the monitored position of the twisted conductor on the support cylinder with a set value; and means provided on the winding device for monitoring the winding diameter of the twisted conductor as it is wound onto said support cylinder.

* * * * *